United States Patent [19]
Boyer

[11] 3,713,671
[45] Jan. 30, 1973

[54] VELOCIPEDE AND CARRIER

[76] Inventor: Alfred N. Boyer, P. O. Box 102, Odell, Oreg. 97044

[22] Filed: March 4, 1971

[21] Appl. No.: 121,065

[52] U.S. Cl. .................280/202, 280/209, 280/267
[51] Int. Cl. ..............................................B62k 13/06
[58] Field of Search............................280/209, 202

[56] References Cited

UNITED STATES PATENTS

| | | | |
|---|---|---|---|
| 571,029 | 11/1896 | Warren | 280/209 |
| 625,377 | 5/1899 | Blood | 280/202 |
| 2,694,582 | 11/1954 | Reside | 280/209 |
| 3,017,198 | 1/1962 | Horowitz | 280/202 |
| 3,516,686 | 6/1970 | Stalder | 280/209 |
| 3,322,224 | 5/1967 | Muller | 280/209 X |

*Primary Examiner*—Leo Friaglia
*Attorney*—Buckhorn, Blore, Klarquist & Sparkman

[57] ABSTRACT

A velocipede has a generally triangularly shaped frame with a first portion oriented forwardly of the vehicle and a second portion disposed perpendicularly to the first portion and rigidly attached thereto. The second portion extends rearwardly of the vehicle and is adapted to seat a first rider for the vehicle. A pair of forward wheels are journaled from the first portion of the frame and are positioned substantially at the ends thereof. A driving wheel is journaled from the second portion of the frame. Pedal means on the second portion permit the rider to actuate the driving wheel. At least one tag-along frame having another driving wheel is universally jointed to the first portion of the frame and extends rearwardly of the vehicle for seating another rider in side-by-side relation with the first rider. The second portion of the vehicle frame and the tag-along frame are so positioned as to space the forward wheels relatively widely apart compared to the driving wheels. A seat is provided for at least one passenger above the pair of forward wheels. A shiftable steering wheel mounted on a crank hub on the first portion of the frame permits steering of the forward wheels by either rider.

4 Claims, 4 Drawing Figures

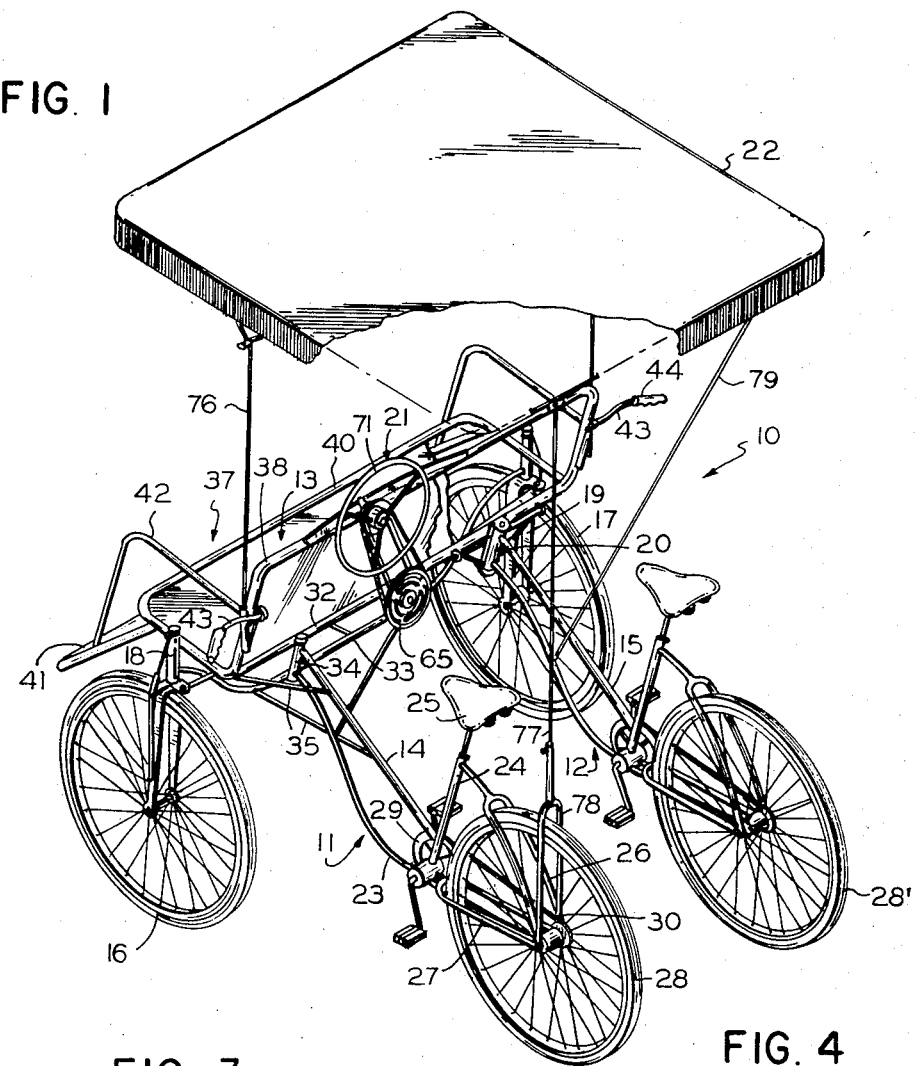

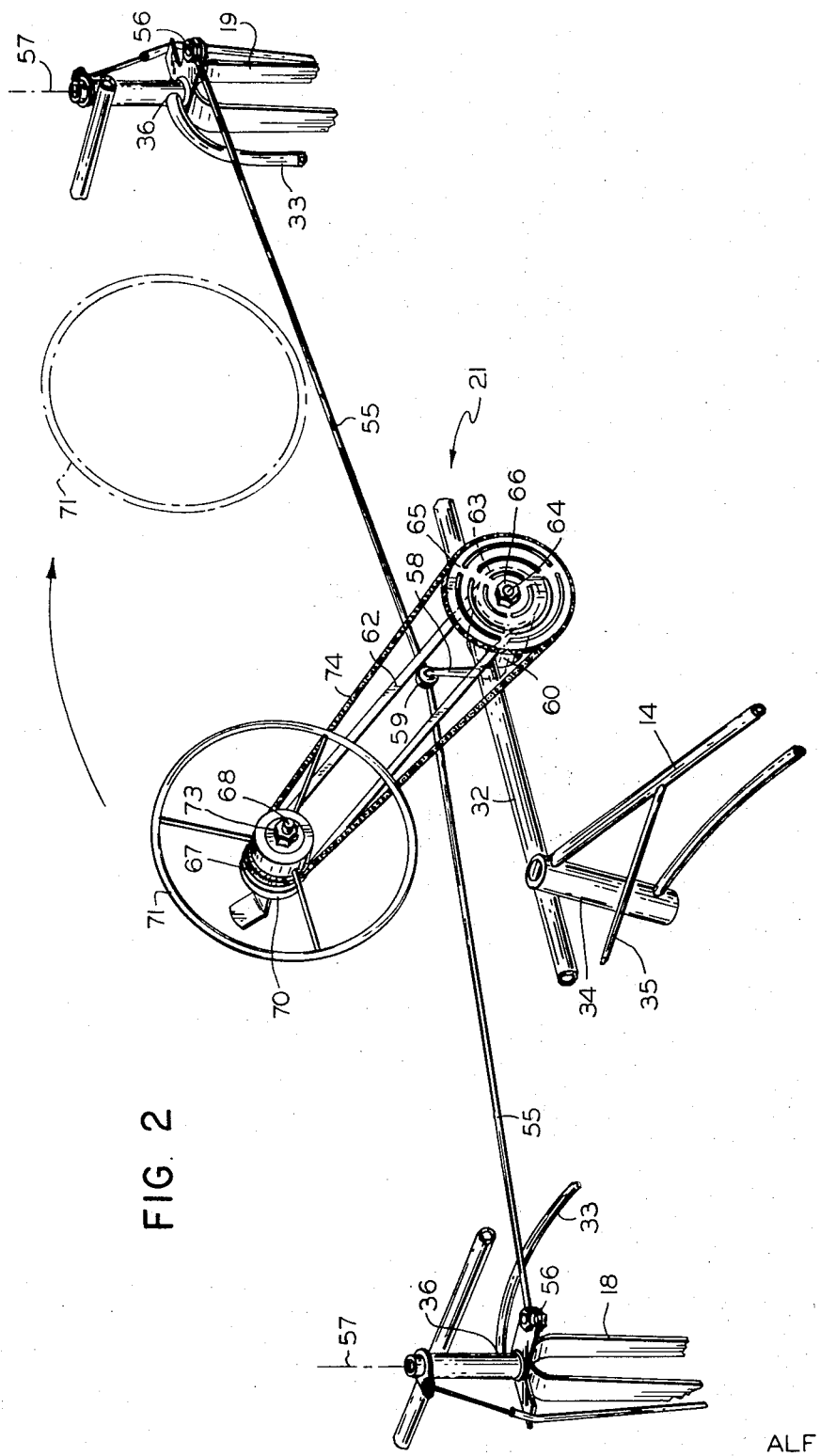

VELOCIPEDE AND CARRIER

BACKGROUND OF THE INVENTION

While three and four wheel pedal driven vehicles of varying construction and complexity have been known for many years, such have generally been very complicated and consequently, relatively expensive to manufacture. Furthermore, those in which a couple can do the pedaling have generally been constructed in tandem fashion, and have limited appeal inasmuch as the couple is precluded from conversation while they are pedaling along.

Accordingly, it is the primary object of the present invention to provide a pedal vehicle wherein a couple can ride side by side as they actuate the same.

A further object of the present invention is to provide such a vehicle that will also provide transportation to nonpedaling passengers.

A still further object of the present invention is to provide such a vehicle wherein the passengers will be transported in the forepart of the vehicle, thereby to enhance the stability thereof.

A still further object of the present invention is to provide such a vehicle having steering means slideable to either side thereof, whereby either one of the pedaling couple selectively may steer the vehicle.

A still further object of the present invention is to provide such a pedal vehicle that will be relatively inexpensive to construct and maintain.

SUMMARY OF THE INVENTION

The pedal vehicle of the present invention comprises a generally triangularly shaped frame having a first portion oriented forwardly of the vehicle and a second portion disposed perpendicularly to the first portion and rigidly attached thereto. The second portion of the frame extends rearwardly of the vehicle and is adapted to seat a first rider for the vehicle thereupon.

A pair of depending forward wheels for the vehicle are journaled in fork means mounted at the ends of the first portion of the frame. A driving wheel for the vehicle is journaled rearwardly of the second portion of the frame. Pedal means are provided on the second portion of the frame for the first rider to actuate the driving wheel.

At least one tag-along frame is universally jointed to the first portion of the vehicle frame for rotation about a vertical axis and about a horizontal axis parallel to such first portion. The tag-along frame also extends rearwardly of the vehicle and is adapted to seat another rider for the vehicle in side-by-side relationship with the first rider. A second driving wheel is journaled from the tag-along frame, and pedal means are provided on the tag-along frame for the other rider to actuate the second driving wheel.

The second or rearward portion of the vehicle frame is disposed intermediate the ends of the first portion, as is the tag-along frame. By this means, the forward wheels are relatively widely spaced, and the driving wheels are relatively narrowly spaced rearwardly of the vehicle.

The first portion of the vehicle frame further comprises eat means to support at least one passenger above the pair of forward wheels.

Steering of the vehicle is effected by either pedaler by means of a shiftable steering wheel mounted on a crank hub on the first portion of the vehicle frame.

BRIEF DESCRIPTION OF THE DRAWINGS

FIG. 1 is a perspective view of the pedal vehicle of the present invention.

FIG. 2 is a detailed view of the steering mechanism for the forward wheels.

FIG. 3 is a detailed view of the universal joint attachment of the tag-along frame to the main vehicle frame.

FIG. 4 is a top view of an embodiment of the invention having two tag-along frames for three pedalers.

DETAILED DESCRIPTION OF THE PREFERRED EMBODIMENTS

Referring to the drawings, the pedal vehicle 10 of the present invention can be economically and efficiently constructed from portions of bicycles of ordinary construction. Specifically, the rear portions of a first bicycle 11 and a second bicycle 12 are used intact in the vehicle of the present invention. A forward frame 13 is constructed to which the rear portions 14,15 of the first and second bicycles are attached in a manner to be hereinafter described; and the front wheels 16,17 of the two bicycles, together with their supporting fork assemblies 18,19, are positioned at the ends of the frame 13.

The rear portion 14 of the first bicycle 11 is rigidly attached to the frame 13. The rear portion 15 of the second bicycle 12 is attached to the frame 13 by a universal joint 20. (See FIG. 3.) A steering assembly 21 is provided to steer both of the forward wheels 16 and 17 in parallel. A canopy 22 attached to the frame 13 and the rear portion 14 of the first bicycle 11 is also provided. The frame 13 is also desirably constructed so as to provide a seat for passengers above the forward wheels 16,17.

Considering now the various parts with greater particularity, the rear portion 14 of the frame of the first bicycle 11 consists of the usual rear framework 23 and provides a post 24 to support a seat 25. A rear fork 26 and rearwardly extending braces 27 provide means for journaling a driving wheel 28 which is actuatable by the usual sprocket 29 and chain 30 making up the driving or propelling mechanism.

The rear portion 15 of the second bicycle 12 consists of the same parts as used from the first bicycle 11 and the two frames are attached to the forward frame 13 to make up the main frame of the vehicle of the invention.

Specifically, the forward frame 13 consists of a main horizontal bar 32 and a secondary horizontal bar 33. The forward post 34 of the frame 14 of the first bicycle 11 is welded to bar 32 and is supported by diagonal bracing 35. The secondary horizontal bar 33 is connected at each end 36 to front forks 18 and 19.

A seating framework 37 is welded to the ends of the main horizontal bar 32 and consists of a back supporting portion 38 and a seating portion 40 from which a footrest frame 41 is supported by means of side supports 42. A handlebar 43 is welded to the outside of each end of the back supporting portion 38 and is equipped with a handgrip 44.

The manner of attachment of the frame 15 of the second bicycle 12 to the main bar 32 of the forward frame 13 is shown in FIG. 3. The forward post 45 of the second bicycle 12 is rotatably supported for rotation about a vertical axis 46 in a bracket 47 which in turn is welded to a triangular frame 48 consisting of a sleeve 50 and supporting braces 51. The sleeve 50 is journaled in supports 52 welded to the main horizontal bar 32 and is rotatable about a horizontal axis 53 parallel to such bar on a carriage bolt 54. By this means, the frame 15 of the second bicycle 12 is attached to the forward frame 13 of the vehicle, but is universally jointed with respect thereto for rotation about the vertical axis 46 and about the horizontal axis 53. Thus the vehicle 10 is always stable because of its three-wheeled construction, and yet the frame 15 of the second bicycle 12 may be carried therealong and accommodate variations in terrain without causing strain on its attachment.

The front fork assemblies 18,19 of the two bicycles 11,12 are welded to the main horizontal bar 32 of the forward frame 13. The forward wheels 16,17 of the bicycles are journaled in usual fashion from the front forks 18,19. In the preferred construction, the spacing of the forward wheels 16,17 is further apart than that of the driving wheels 28,28' on the first and second bicycles. This provides a more stable vehicle better adapted to support passengers on the seating framework 37.

The steering assembly 21 consists of tie rods 55 attached to each of the front forks 18,19 at a point 56 offset rearwardly from the vertical axes 57 about which such forks rotate. Each of the tie rods 55 is in turn attached to a crank 58 by an eye 59 at its inboard end. The crank 58 is journaled in a hub 60 which is welded to the main horizontal bar 32 of the forward frame 13.

A steering wheel support 62 is journaled at its lower end 63 on the rearward portion 64 of the crank 58 which also supports a lower sprocket 65, the assembly being retained thereupon by a nut 66 threadedly engaged thereto. A second or upper sprocket 67 is attached to a lug 68 attached to the upper end 70 of the support 62, and a steering wheel 71 for the vehicle is mounted on the lug 68 rearwardly of the upper sprocket 67, being retained thereupon by a nut 73.

A chain 74 is entrained around the two sprockets 65,67 whereby rotation of the steering wheel 71 rotates the sprockets and causes rotation of the crank 58. This in turn causes transverse horizontal movement of the tie rods 55 and rotates the forks 18,19 about their vertical axes 57 to cause simultaneous parallel steering of the front wheels 16,17 of the vehicle.

A feature of the invention resides in the fact that the support 62 for the steering wheel 71 is pivotally mounted for rotation on the rear portion 64 of the crank 58. Thus the wheel 71 may be shifted from one side of the vehicle (as shown in the solid lines in FIG. 2) to the other side (as shown in the dashed lines in FIG. 2), thereby to be used selectively by either of the riders.

The canopy 22 for the vehicle is desirably supported on a forward post 76 attached to the front frame 13. A rear post 77 is used to support the rear of the canopy, being itself supported on a fork 78 on the braces 27 of the first bicycle. A diagonal strut 79 extending from the post 77 furnishes additional support for the rear of the canopy 22. It is to be noted that the canopy 22 is not supported in any way on the frame 15 of the second bicycle 12 due to its universal jointed attachment to the front frame 13.

FIG. 4 illustrates an embodiment of the invention in which two tag-along bicycles 82,83 are universally jointed to a forward frame 84 which is itself rigidly attached to the rear portion 85 of the frame of a third bicycle 86. The forward frame 84 is also constructed so as to form a seating framework 87 for passengers in the vehicle. A steering assembly 88 as hereinabove described is provided to steer the forward wheels 90,91 of the vehicle simultaneously in parallel. The steering assembly 88 is made pivotal on the main frame 84 so as to be transferable to any one of the three riders.

I claim:
1. A pedal vehicle comprising
   a generally triangularly shaped frame, said frame having a first portion oriented forwardly of said vehicle and a second portion disposed perpendicularly to said first portion and rigidly attached thereto, said second portion extending rearwardly of said vehicle and being adapted to seat a first rider for said vehicle thereupon;
   a pair of depending forward wheels for said vehicle journaled from said first portion and positioned substantially at the ends thereof;
   a driving wheel journaled from said second portion;
   means on said first portion to steer said forward wheels simultaneously in parallel;
   pedal means on said second portion for said first rider to actuate said driving wheel;
   at least one tag-along frame universally jointed to said first portion for rotation about two mutually perpendicular
   axes, said tag-along frame extending rearwardly of said vehicle and being adapted to seat another rider for said
   vehicle in side-by-side relation with said first rider;
   a second driving wheel journaled from said tag-along frame; and
   pedal means on said tag-along frame for said other rider to actuate said second driving wheel.

2. A pedal vehicle as in claim 1 in which said first portion of said frame comprises seat means to support at least one passenger above said pair of forward wheels.

3. A pedal vehicle as in claim 1 in which said second portion of said frame is disposed intermediate said ends of said first portion.

4. A pedal vehicle as in claim 3 in which said tag-along frame is attached to said first portion of said frame intermediate said ends thereof.

* * * * *